United States Patent [19]

Vollrath

[11] Patent Number: 5,440,422
[45] Date of Patent: Aug. 8, 1995

[54] METHOD FOR MANUFACTURING ULTRAVIOLET MICROSCOPE DRY OBJECTIVES AND MICROSCOPE OBJECTIVES MANUFACTURED IN ACCORDANCE WITH THIS METHOD

[75] Inventor: Wolfgang Vollrath, Burbach-Oberdresselndorf, Germany

[73] Assignee: Leica Mikroskopie und Systeme GmbH, Wetzlar, Germany

[21] Appl. No.: 76,121

[22] Filed: Jun. 14, 1993

[30] Foreign Application Priority Data

Jun. 12, 1992 [DE] Germany .............. 42 19 205.6

[51] Int. Cl.⁶ .................... G02B 13/14; G02B 11/34
[52] U.S. Cl. ................................. 359/355; 359/657
[58] Field of Search ................ 359/350, 354, 355, 657

[56] References Cited

U.S. PATENT DOCUMENTS

| | | | |
|---|---|---|---|
| 3,348,896 | 10/1967 | Betensky . | |
| 4,050,778 | 9/1977 | Fleischman | 359/355 |
| 4,059,342 | 11/1977 | Tojyo | 350/175 ML |
| 4,832,472 | 5/1989 | Robb | 359/355 |
| 5,103,341 | 4/1992 | Ulrich et al. | 359/657 |
| 5,121,255 | 6/1992 | Hayashi | 359/355 |
| 5,144,475 | 9/1992 | Hayashi | 359/355 |
| 5,159,492 | 10/1992 | Hayashi | 359/355 |

FOREIGN PATENT DOCUMENTS

| | | |
|---|---|---|
| 0269926A2 | 6/1988 | European Pat. Off. . |
| 0284414A2 | 9/1988 | European Pat. Off. . |
| 2602730A1 | 7/1976 | Germany . |
| 3915868 | 11/1990 | Germany . |

*Primary Examiner*—Martin Lerner
*Attorney, Agent, or Firm*—Foley & Lardner

[57] ABSTRACT

A method for the manufacture of quasi-monochromatic microscope dry objectives for a wavelength range from 190 to 360 nanometers proceeds from a basic objective with a specified number of lenses. The basic objective is corrected for a specified wavelength with respect to image aberrations. By using lenses with slightly different production thicknesses and by arranging the lenses at different air separations, objectives for other areas of application are created. All of the objectives have the same number of lenses and virtually the same resolution. The data for three objectives derived from a basic objective are provided as an example.

8 Claims, 3 Drawing Sheets

METHOD FOR MANUFACTURING ULTRAVIOLET MICROSCOPE DRY OBJECTIVES AND MICROSCOPE OBJECTIVES MANUFACTURED IN ACCORDANCE WITH THIS METHOD

BACKGROUND OF THE INVENTION

The invention is directed to a method for manufacturing ultraviolet (UV) microscope dry objectives and to microscope objectives manufactured in accordance with this method.

German Patent Publication DE 3,915,868 A1 discloses a dry objective suitable for UV light which has an aperture greater than 0.70 and a magnification of at least 60 times. Correction is provided for aperture aberration for the visible spectral range and also for a specific UV wavelength. However, correction for both the visible spectral range and the UV wavelength at the same time is not provided.

This conventional objective includes at least 11 lenses. At least two lens elements are displaceable relative to one another. The separation of these displaceable lens elements relative to one another determines the wavelength for which the objective is adjusted. Because this separation is set on an outer objective mount, this objective requires an appropriately constructed mechanical mount. If even only a slight radial displacement occurs in the course of axial adjustment of the displaceable lens elements, asymmetric image aberration (coma) occurs over the entire image field. For this reason, the requirements imposed upon the precision of manufacture of this conventional objective are very stringent. Furthermore, when adjusted for UV light, only aperture aberration is corrected, not the aberrations for the larger image field.

As a result of the progressively increasing availability and use of excimer lasers and other lasers emitting short-wavelength UV light having wavelengths between 190 nanometers (nm) and 360 nm there is an increasing need for limited-diffraction-corrected imaging systems for this spectral range. This spectral range of 190 nm to 360 nm will be referred to as the DUV range. Since only a very small number of optical materials which can be used in the DUV range exist, and since in the DUV range the refractive index is very strongly dependent upon wavelength, correction of the color fields over the entire DUV range or even only a significant partial spectrum thereof is not possible. Especially for wavelengths below 300 nm, as a rule only monochromatic objectives or quasi-monochromatic objectives can be constructed. These have a spectral bandwidth on the order of plus or minus one nanometer.

When working at only one discrete wavelength, these restrictions are not necessarily disadvantageous. However, from the standpoint of manufacturing such systems, these restrictions mean that to cover a multiplicity of wavelengths, specifically optimized components must be developed and manufactured for each wavelength and also for various categories of application. For example, in the machining of materials using excimer lasers it is desirable to provide objectives with a large free working space and a small to medium aperture. In contrast, the generation of small structures in the submicrometer range by photolithographic processes and the measurement of such structures requires objectives with the highest possible aperture, and necessarily a small free working space. This requirement for a multiplicity of objectives leads to correspondingly high manufacturing costs.

Thus, there is a real need for an improved method of manufacturing UV microscope dry objectives.

SUMMARY OF THE INVENTION

Since in many cases the adaptability of the objective to different wavelengths is not required by an individual user, an object of this invention is to provide a system of UV microscope dry objectives having a relatively simple optical construction using a system of prefabricated parts. In the invention, image aberrations are corrected for at the center of the image and in the image field primarily for one UV wavelength and the objective can be adapted to other wavelengths using simple measures during manufacturing.

According to one aspect of the invention, there is provided a method of manufacturing quasi-monochromatic microscope dry objectives for desired wavelengths between 190 and 360 nanometers. In accordance with this method, a basic objective having a predetermined number of lenses spaced relative to one another is established. The basic objective is corrected for image aberrations at the center of the image and for aberrations in the image field for a base wavelength. The basic objective is then modified to produce a second objective. The second objective has the same predetermined number of lenses. The second objective is corrected for selected wavelengths and has substantially the same resolving power as the basic objective. The basic objective and the second objective differ from each other in at least one of the following ways: (i) the spacing of the predetermined number of lenses with respect to one another in the basic objective is different from the spacing of the predetermined number of lenses with respect to one another in the second objective; and/or (ii) the thickness of at least one lens in the basic objective is different from the thickness of a corresponding lens in the second objective by a normal production variance.

According to another aspect of the invention, there is provided a system of microscope dry objectives wherein a basic objective A has seven lenses 1, 3, 5, 7, 9, 11, and 13 with the following data:

| Wavelength (nm): 325; | Focal length (mm): 2.50 |
| Aperture: 0.90; | SDH(0): 0.997 |
| SDH(0.05): 0.907; | |

| Surface No. | Radius (mm) | Thickness/ separation (mm) A |
| --- | --- | --- |
| 1 | −3.687 | 2.70 |
| 2 | 14.488 | 1.70 |
| 3 | 178.371 | 2.45 |
| 4 | −10.002 | 2.62 |
| 5 | 87.083 | 3.10 |
| 6 | −12.987 | 1.05 |
| 7 | 17.406 | 2.50 |
| 8 | −63.274 | 0.60 |
| 9 | 9.119 | 2.10 |
| 10 | 27.449 | 0.20 |
| 11 | 5.408 | 2.00 |
| 12 | 9.824 | 0.15 |
| 13 | 2.040 | 2.03 |
| 14 | 1.714 | — | where SDH (x) signifies the Strehl definition brightness for an object height x in mm and lenses 1, 3, 5, 7, 9, 11, and 13 are produced from quartz glass.

Other objects, features, and advantages of the invention will be apparent from the detailed description of preferred embodiments below.

BRIEF DESCRIPTION OF THE DRAWINGS

The invention will be described in further detail below with reference to the accompanying drawings, wherein.

DETAILED DESCRIPTION OF PREFERRED EMBODIMENTS

The manufacturing method according to the instant invention employs a system of prefabricated parts. The starting point is a basic objective which is corrected primarily for a single wavelength and which exhibits, at that wavelength, a specified focal length and aperture. For a series of applications of such an objective, it is entirely sufficient that the actual focal length lie in the vicinity of the nominal focal length and that the aperture is sufficiently large. In the case of diffraction-limited imaging, for example, the same resolving power can be achieved either with 325 nm light and an aperture of 0.90 or with 248 nm light and an aperture of 0.70. In both cases, the radius of the diffraction disc is 0.22 micrometer, so use in the low submicrometer range is equally possible in each instance.

The manufacturing method for UV light microscope objectives according to the instant invention makes use of these degrees of freedom, that is, focal length and aperture. In the invention, just by changing separation and/or by changing the thickness of possibly only one lens within the limits of generous thickness tolerances (for example, plus or minus 0.2 mm) aberration correction at the center of an image and in the image field is transferred to other wavelengths.

Since the permissible change in thickness is only required to be within the limits of production tolerances, a special production of lenses with specified wavelength-specific thicknesses is not required. Instead, within the limits of normal production variances, lenses with the required thicknesses can be selected and can be associated with the objectives for the desired wavelength(s). The required wavelength-specific aperture is defined by the free diameter of a corresponding mount part, which can be varied easily.

Figure 1A:
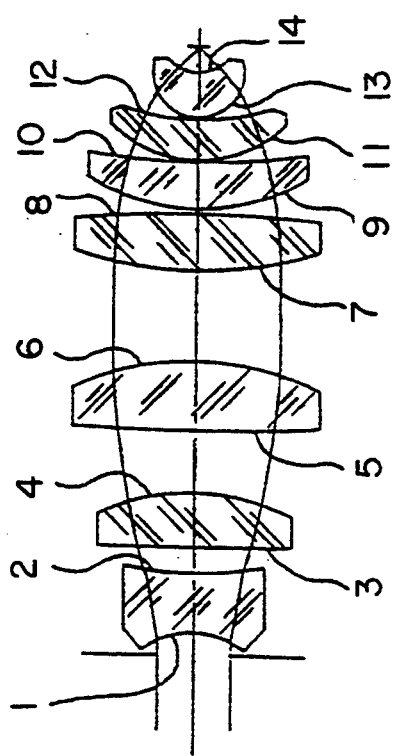
FIG. 1a illustrates a lens section through a basic objective according to the invention.
Figure 1B:
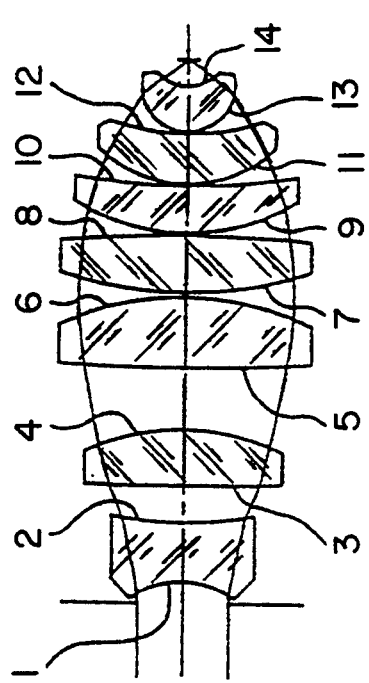
FIGS. 1b, 1c, and 1d illustrate lens sections of three objectives which are derived from the basic objective.
Figure 1C:
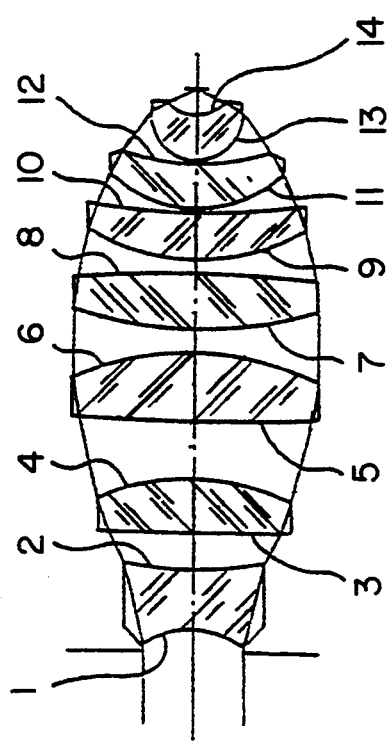
Figure 1D:
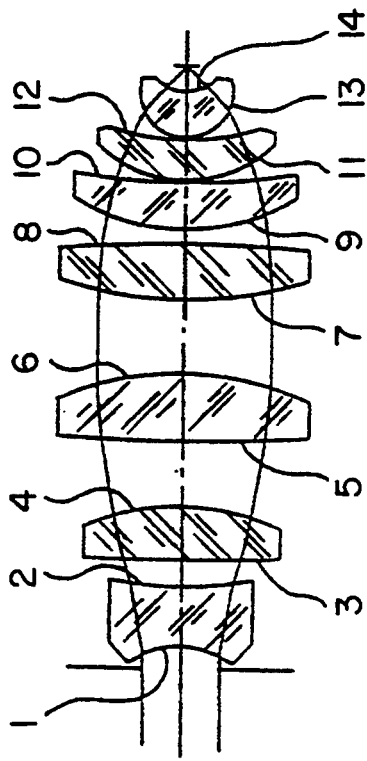
Figure 2B:
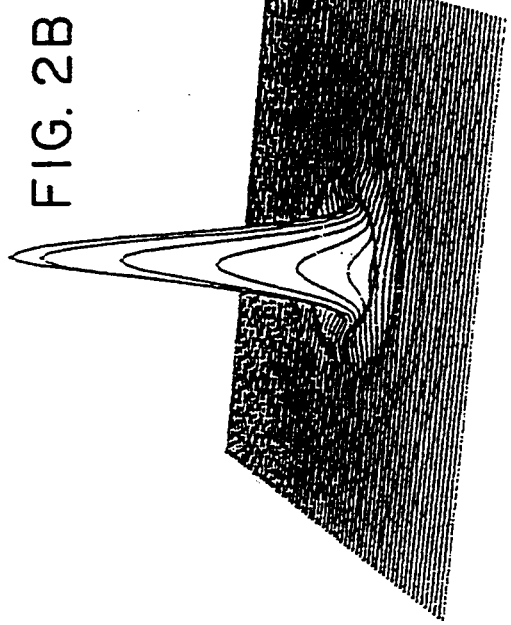
FIGS. 2a, 2b, 2c, and 2d illustrate optical diffraction point image functions of the objectives of FIGS. 1a, 1b, 1c, and 1d, respectively, for the center of each image (x = 0)
Figure 2D:
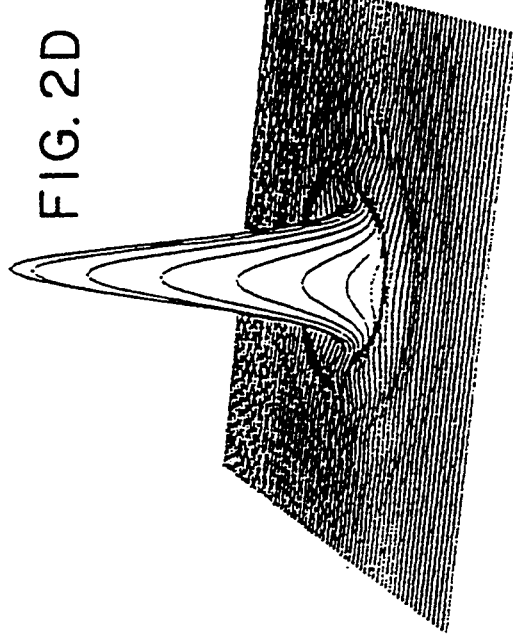
Figure 2A:
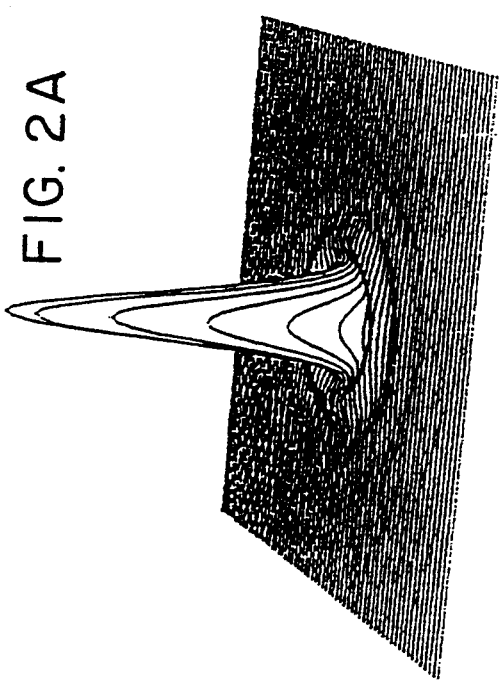
Figure 2C:
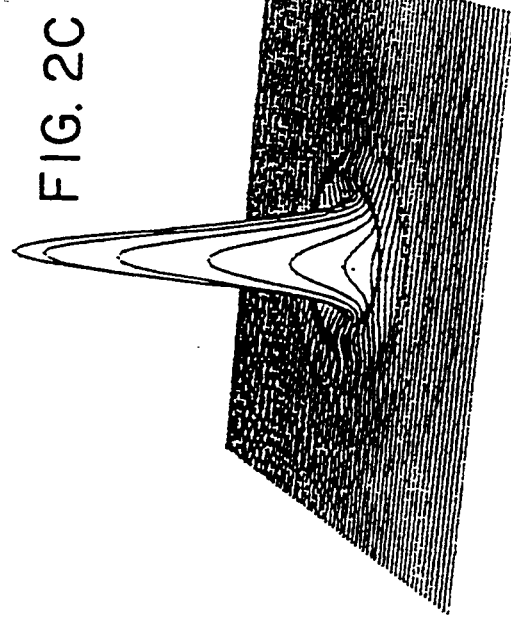
Figure 3A:
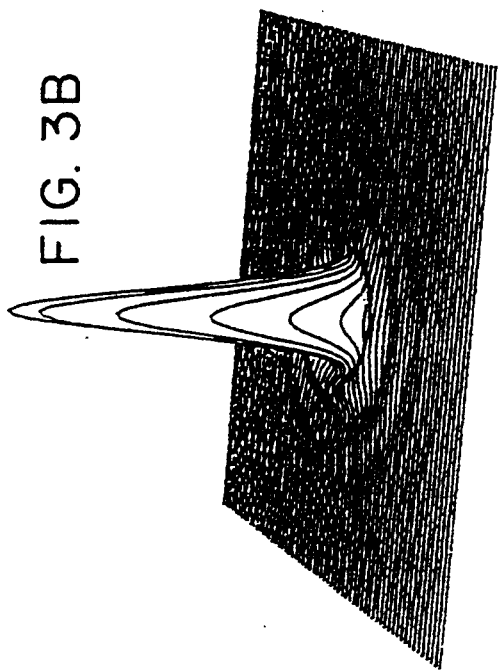
FIGS. 3a, 3b, 3c, and 3d illustrate optical diffraction point image functions for the objectives of FIGS. 1a, 1b, 1c, and 1d, respectively, for an image height of x = 0.05 mm.
Figure 3B:
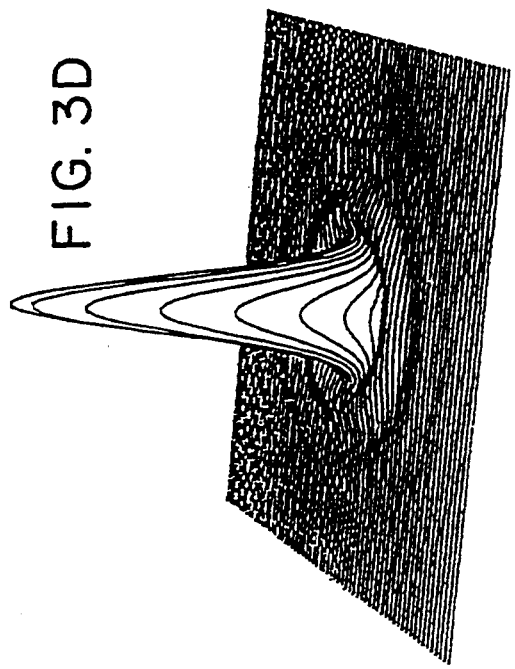
Figure 3C:
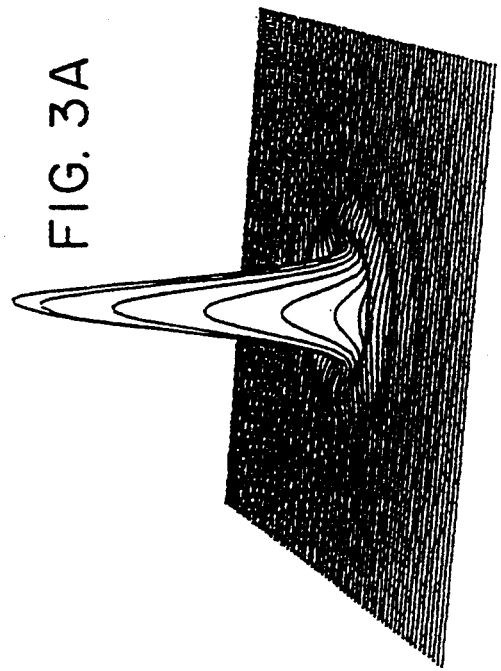
Figure 3D:
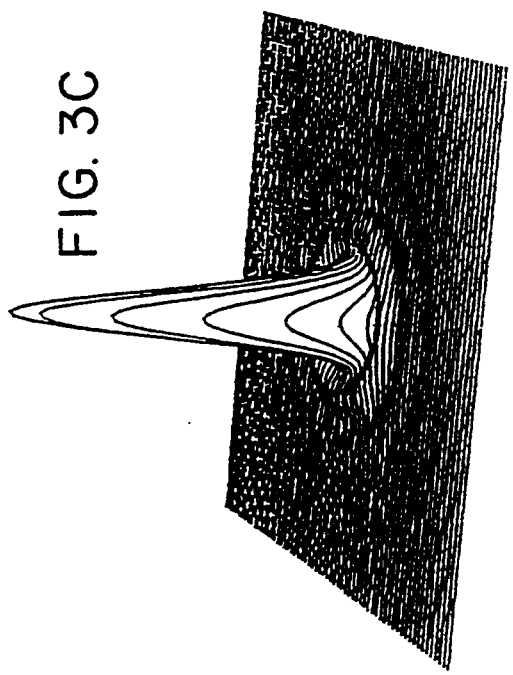

FIGS. 1a, 1b, 1c, and 1d show UV microscope dry objectives which are manufactured in accordance with the instant invention. FIG. 1a illustrates a lens section through a basic objective and FIGS. 1b, 1c, and 1d illustrate lens sections of three objectives which are derived from the basic objective.

FIGS. 2a, 2b, 2c, and 2d illustrate optical diffraction point image functions of the objectives of FIGS. 1a, 1b, 1c, and 1d, respectively, for the center of each image (x=0). FIGS. 3a, 3b, 3c, and 3d illustrate optical diffraction point image functions for the objectives of FIGS. 1a, 1b, 1c, and 1d, respectively, for an image height of x=0.05 mm.

The table below provides a listing of properties for the basic objective A for 325 nm light and also for three objectives B, C, and D which are derived from the basic objective A.

|   | Wavelength (nm) | Focal length (mm) | Aperture | SDH (0) | SDH (0.05) |
|---|---|---|---|---|---|
| A | 325 | 2.50 | 0.90 | 0.997 | 0.907 |
| B | 248 | 2.35 | 0.70 | 0.992 | 0.972 |
| C | 257 | 2.39 | 0.70 | 0.990 | 0.979 |
| D | 355 | 2.49 | 0.80 | 0.997 | 0.963 |

In this table SDH (x) designates the Strehl definition brightness for an object height x (mm). SDH can have a maximum value of 1 and in the case of an optical system corrected on a diffraction-limited basis must be at least 0.8.

The four objectives A, B, C, and D have the following properties:

| Surface No. | Radius (mm) | Thickness/separation (mm) | | | |
|---|---|---|---|---|---|
| | | A | B | C | D |
| 1 | −3.687 | 2.70 | —.— | —.— | —.— |
| 2 | 14.488 | 1.70 | 1.20 | 1.23 | 1.64 |
| 3 | 178.371 | 2.45 | —.— | —.— | —.— |
| 4 | −10.002 | 2.62 | 2.71 | 2.93 | 2.75 |
| 5 | 87.083 | 3.10 | —.— | —.— | —.— |
| 6 | −12.987 | 1.05 | 3.97 | 3.30 | 0.20 |
| 7 | 17.406 | 2.50 | —.— | —.— | —.— |
| 8 | −63.274 | 0.60 | 0.21 | 0.63 | 0.10 |
| 9 | 9.119 | 2.10 | —.— | —.— | —.— |
| 10 | 27.449 | 0.20 | 0.10 | 0.11 | 0.10 |
| 11 | 5.408 | 2.00 | 1.80 | 1.81 | 2.20 |
| 12 | 9.824 | 0.15 | 0.10 | 0.11 | 0.17 |
| 13 | 2.040 | 2.03 | —.— | —.— | —.— |
| 14 | 1.714 | —.— | —.— | —.— | —.— |

The instant invention is not limited to the objectives described above merely by way of example and their properties, but instead comprehends all focal length/aperture combinations which are customary in objectives for microscopes. With a barrel lens having a focal length of 250 mm, an intermediate image diameter of 10 mm corresponds to an object height of x=0.05 mm. For applications in which this relatively large intermediate image diameter is not required, the correction of the coma can be restricted to appropriate smaller diameters and aperture aberration can be corrected over a larger aperture. The objective C for 257 nm light and having an 0.70 aperture can be adapted in accordance with the invention to provide an objective E which has the following properties:

| Surface No. | Radius (mm) | Thickness/ separation (mm) |
|---|---|---|
| 2 | 14.488 | 1.28 |
| 4 | −10.002 | 3.02 |
| 6 | −12.987 | 4.96 |
| 8 | −63.274 | 0.92 |
| 10 | 27.449 | 0.10 |
| 11 | 5.408 | 1.80 |
| 12 | 9.824 | 0.10 |

The values 0.984 and 0.970 are obtained for SDH (0) and SDH (0.05), respectively, in this case.

Although the invention has been described above with reference to certain specific embodiments, the scope of the invention is not limited to the embodiments described above. Other designs, modifications, and applications within the spirit and scope of the invention will be apparent to those skilled in the art after receiving the above teachings. The scope of the invention, therefore, is defined with reference to the following claims.

What is claimed is:

1. A system of microscope dry objectives comprising: a basic objective A having seven lenses 1, 3, 5, 7, 9, 11, and 13 with the following data

| Wavelength (nm): 325; | Focal length (mm): 2.50 |
|---|---|
| Aperture: 0.90; | SDH(0): 0.997 |
| SDH(0.05): 0.907; | |

| Surface No. | Radius (mm) | Thickness/ separation (mm) A |
|---|---|---|
| 1 | −3.687 | 2.70 |
| 2 | 14.488 | 1.70 |
| 3 | 178.371 | 2.45 |
| 4 | −10.002 | 2.62 |
| 5 | 87.083 | 3.10 |
| 6 | −12.987 | 1.05 |
| 7 | 17.406 | 2.50 |
| 8 | −63.274 | 0.60 |
| 9 | 9.119 | 2.10 |
| 10 | 27.449 | 0.20 |
| 11 | 5.408 | 2.00 |
| 12 | 9.824 | 0.15 |
| 13 | 2.040 | 2.03 |
| 14 | 1.714 | — | where SDH (x) signifies the Strehl definition brightness for the object height x (in mm) and lenses 1, 3, 5, 7, 9, 11, and 13 are produced from quartz glass.

2. A system of microscope dry objectives comprising: an objective B having seven lenses 1, 3, 5, 7, 9, 11, and 13 which have the following properties

| Wavelength (nm) | 248 |
|---|---|
| Focal length (mm) | 2.35 |
| Aperture | 0.70 |
| SDH (0) | 0.992 |
| SDH (0.05) | 0.972 |

| Surface No. | Radius (mm) | Thickness/ separation (mm) |
|---|---|---|
| 1 | −3.687 | —.— |
| 2 | 14.488 | 1.20 |
| 3 | 178.371 | —.— |
| 4 | −10.002 | 2.71 |
| 5 | 87.083 | —.— |
| 6 | −12.987 | 3.97 |
| 7 | 17.406 | —.— |
| 8 | −63.274 | 0.21 |
| 9 | 9.119 | —.— |
| 10 | 27.449 | 0.10 |
| 11 | 5.408 | 1.80 |
| 12 | 9.824 | 0.10 |
| 13 | 2.040 | —.— |
| 14 | 1.714 | —.— | where SDH (x) signifies the Strehl definition brightness for the object height x (in mm).

3. A system of microscope dry objectives comprising: an objective C having seven lenses 1, 3, 5, 7, 9, 11, and 13 which have the following properties

| Wavelength (nm) | 257 |
|---|---|
| Focal length (mm) | 2.39 |
| Aperture | 0.70 |
| SDH (0) | 0.990 |
| SDH (0.05) | 0.979 |

| Surface No. | Radius (mm) | Thickness/ separation (mm) |
|---|---|---|
| 1 | −3.687 | —.— |
| 2 | 14.488 | 1.23 |
| 3 | 178.371 | —.— |
| 4 | −10.002 | 2.93 |
| 5 | 87.083 | —.— |
| 6 | −12.987 | 3.30 |
| 7 | 17.406 | —.— |
| 8 | −63.274 | 0.63 |
| 9 | 9.119 | —.— |
| 10 | 27.449 | 0.11 |
| 11 | 5.408 | 1.81 |
| 12 | 9.824 | 0.11 |
| 13 | 2.040 | —.— |
| 14 | 1.714 | —.— | where SDH (x) signifies the Strehl definition brightness for the object height x (in mm).

4. A system of microscope dry objectives comprising: an objective D having seven lenses 1, 3, 5, 7, 9, 11, and 13 which have the following properties

| Wavelength (nm) | 355 |
|---|---|
| Focal length (mm) | 2.49 |
| Aperture | 0.80 |
| SDH (0) | 0.997 |
| SDH (0.05) | 0.963 |

| Surface No. | Radius (mm) | Thickness/ separation (mm) |
|---|---|---|
| 1 | −3.687 | —.— |
| 2 | 14.488 | 1.64 |
| 3 | 178.371 | —.— |
| 4 | −10.002 | 2.75 |
| 5 | 87.083 | —.— |
| 6 | −12.987 | 0.20 |
| 7 | 17.406 | —.— |
| 8 | −63.274 | 0.10 |
| 9 | 9.119 | —.— |
| 10 | 27.449 | 0.10 |
| 11 | 5.408 | 2.20 |
| 12 | 9.824 | 0.17 |
| 13 | 2.040 | —.— |
| 14 | 1.714 | —.— | where SDH (x) signifies the Strehl definition brightness for the object height x (in mm).

5. A method of manufacturing quasi-monochromatic microscope dry objectives for desired wavelengths between 190 and 360 nanometers, comprising the steps of:

(a) establishing a basic objective configuration corresponding to a basic objective A having a predetermined number of lenses spaced relative to one another, said basic objective being corrected for image aberrations at a center of an image and being corrected for aberrations in an image field for a base wavelength;

(b) modifying said basic objective configuration to produce a second objective, said second objective being one of three objectives B, C, and D, said second objective having said predetermined number of lenses, said second objective being corrected for a selected wavelength and having substantially the same resolving power as said basic objective, said second objective and said basic objective differing from each other in that (i) a spacing of said predetermined number of lenses with respect to one another in said second objective is different from a spacing of said predetermined number of lenses with respect to one another in said basic objective; and (ii) a thickness of at least one lens in said second objective is deliberately different from a thickness of a corresponding lens in said basic objective by a normal production variance;

wherein the basic objective A has seven lenses 1, 3, 5, 7, 9, 11, and 13 with the following data

| Wavelength (nm): 325; Aperture: 0.90; SDH(0.05): 0.907; | Focal length (mm): 2.50 SDH(0): 0.997 | |
|---|---|---|
| Surface No. | Radius (mm) | Thickness/ separation (mm) A |
| 1 | −3.687 | 2.70 |
| 2 | 14.488 | 1.70 |
| 3 | 178.371 | 2.45 |
| 4 | −10.002 | 2.62 |
| 5 | 87.083 | 3.10 |
| 6 | −12.987 | 1.05 |
| 7 | 17.406 | 2.50 |
| 8 | −63.274 | 0.60 |
| 9 | 9.119 | 2.10 |
| 10 | 27.449 | 0.20 |
| 11 | 5.408 | 2.00 |
| 12 | 9.824 | 0.15 |
| 13 | 2.040 | 2.03 |
| 14 | 1.714 | — | where SDH (x) signifies the Strehl definition brightness for the object height x ( in mm) and lenses 1, 3, 5, 7, 9, 11, and 13 are produced from quartz glass.

6. The method according to claim 5 wherein the objective B has seven lenses 1, 3, 5, 7, 9, 11, and 13 which have the following properties

| Wavelength (nm) | 248 |
|---|---|
| Focal length (mm) | 2.35 |
| Aperture | 0.70 |
| SDH (0) | 0.992 |
| SDH (0.05) | 0.972 |

| Surface No. | Radius (mm) | Thickness/ separation (mm) |
|---|---|---|
| 1 | −3.687 | —.— |
| 2 | 14.488 | 1.20 |
| 3 | 178.371 | —.— |
| 4 | −10.002 | 2.71 |
| 5 | 87.083 | —.— |
| 6 | −12.987 | 3.97 |
| 7 | 17.406 | —.— |
| 8 | −63.274 | 0.21 |
| 9 | 9.119 | —.— |
| 10 | 27.449 | 0.10 |
| 11 | 5.408 | 1.80 |
| 12 | 9.824 | 0.10 |
| 13 | 2.040 | —.— |
| 14 | 1.714 | —.— | where SDH (x) signifies the Strehl definition brightness for the object height x (in mm).

7. The method according to claim 5 wherein the objective C has seven lenses 1, 3, 5, 7, 9, 11, and 13 which have the following properties

| Wavelength (nm) | 257 |
|---|---|
| Focal length (mm) | 2.39 |
| Aperture | 0.70 |
| SDH (0) | 0.990 |
| SDH (0.05) | 0.979 |

| Surface No. | Radius (mm) | Thickness/ separation (mm) |
|---|---|---|
| 1 | −3.687 | —.— |
| 2 | 14.488 | 1.23 |
| 3 | 178.371 | —.— |
| 4 | −10.002 | 2.93 |
| 5 | 87.083 | —.— |
| 6 | −12.987 | 3.30 |
| 7 | 17.406 | —.— |
| 8 | −63.274 | 0.63 |
| 9 | 9.119 | —.— |
| 10 | 27.449 | 0.11 |
| 11 | 5.408 | 1.81 |
| 12 | 9.824 | 0.11 |
| 13 | 2.040 | —.— |
| 14 | 1.714 | —.— | where SDH (x) signifies the Strehl definition brightness for the object height x (in mm).

8. The method according to claim 5 wherein the objective D has seven lenses 1, 3, 5, 7, 9, 11, and 13 which have the following properties

| Wavelength (nm) | 355 |
|---|---|
| Focal length (mm) | 2.49 |
| Aperture | 0.80 |
| SDH (0) | 0.997 |
| SDH (0.05) | 0.963 |

| Surface No. | Radius (mm) | Thickness/ separation (mm) |
|---|---|---|
| 1 | −3.687 | —.— |
| 2 | 14.488 | 1.64 |
| 3 | 178.371 | —.— |
| 4 | −10.002 | 2.75 |
| 5 | 87.083 | —.— |
| 6 | −12.987 | 0.20 |
| 7 | 17.406 | —.— |
| 8 | −63.274 | 0.10 |
| 9 | 9.119 | —.— |
| 10 | 27.449 | 0.10 |
| 11 | 5.408 | 2.20 |
| 12 | 9.824 | 0.17 |
| 13 | 2.040 | —.— |
| 14 | 1.714 | —.— | where SDH (x) signifies the Strehl definition brightness for the object height x (in mm).

* * * * *